US012776792B2

(12) United States Patent
Huang

(10) Patent No.: US 12,776,792 B2
(45) Date of Patent: Oct. 27, 2026

(54) HIGH-FREQUENCY SWITCHING EXTENDERS AND QUAD-FREQUENCY SWITCHING EXTENDERS HAVING THE SAME

(71) Applicant: ARCADYAN TECHNOLOGY CORPORATION, Hsinchu City (TW)

(72) Inventor: Boli Huang, Hsinchu City (TW)

(73) Assignee: ARCADYAN TECHNOLOGY CORPORATION, Hsinchu City (TW)

( * ) Notice: Subject to any disclaimer, the term of this patent is extended or adjusted under 35 U.S.C. 154(b) by 458 days.

(21) Appl. No.: 18/506,174

(22) Filed: Nov. 10, 2023

(65) Prior Publication Data

US 2024/0187023 A1 Jun. 6, 2024

(30) Foreign Application Priority Data

Dec. 2, 2022 (TW) .................................. 111146471

(51) Int. Cl.
*H04B 1/00* (2006.01)
*H04B 1/44* (2006.01)

(52) U.S. Cl.
CPC ............... *H04B 1/006* (2013.01); *H04B 1/44* (2013.01)

(58) Field of Classification Search
CPC .................................. H04B 1/44; H04B 1/006
See application file for complete search history.

(56) References Cited

U.S. PATENT DOCUMENTS

| | | | | |
|---|---|---|---|---|
| 9,686,690 | B2 * | 6/2017 | Montemurro | H04B 17/23 |
| 2005/0248402 | A1 * | 11/2005 | Zhenbiao | H03F 1/0261 330/129 |
| 2010/0157858 | A1 * | 6/2010 | Lee | H04B 1/0057 343/904 |
| 2011/0189959 | A1 * | 8/2011 | Rambeau | H04B 1/18 455/63.1 |
| 2015/0378385 | A1 * | 12/2015 | Rana | H03K 3/3562 327/143 |
| 2016/0338065 | A1 * | 11/2016 | Kang | H04W 28/0236 |
| 2018/0184354 | A1 * | 6/2018 | Huang | H04W 40/06 |

* cited by examiner

*Primary Examiner* — Raymond S Dean

(57) ABSTRACT

A high-frequency switching extender is provided, used to receive signals from external routers and devices and transmit transmission signals to external routers and devices. The high-frequency switching extender includes a high-frequency transceiver module, a high-frequency switching module, a high-frequency RF front-end module, a high-frequency filter module, a high-frequency antenna switching unit, and a high-frequency antenna. Wherein, the high-frequency switching extender has a transmission mode and a receiving mode. In transmission mode, the high-frequency switching module switches the transmission signal to the preset frequency band according to the control voltage, and the transmission signal switched to the preset frequency band is transmitted to the high-frequency antenna for transmission. In receiving mode, the high-frequency antenna switching unit switches the received signal to the preset frequency band according to the control voltage, and the received signal switched to the preset frequency band is transmitted to the high-frequency transceiver module.

8 Claims, 11 Drawing Sheets

100

HIGH-FREQUENCY SWITCHING EXTENDERS AND QUAD-FREQUENCY SWITCHING EXTENDERS HAVING THE SAME

CROSS-REFERENCE TO RELATED APPLICATION

This application claims the priority of Taiwanese patent application No. 111146471, filed on Dec. 2, 2022, which is incorporated herewith by reference.

BACKGROUND OF THE INVENTION

1. Field of the Invention

The present invention relates generally to a high-frequency switching extender, in particular to a high-frequency switching extender and a quad-frequency switching extender having the high-frequency switching extender.

2. The Prior Arts

With the development of audio-visual entertainment in wireless networks, the use of high-traffic networks often causes delays due to insufficient network bandwidth. At present, the mainstream solution is to increase the network bandwidth or adjust the priority of the network.

In addition, as the frequency bandwidth used in modern times increases gradually, the transmission frequency bands used by different users may be different. Therefore, there is a demand for wireless communication systems to be able to operate under multiple frequency bands. To meet such a demand, the radio frequency device in the wireless communication systems must operate in multiple frequency bands. Traditionally, for example, a duplexer is used. The duplexer is a necessary element in a multi-band communication system and a multiplex system, and it is a three-port network, that is, an input terminal and two output terminals for separating signals of different frequencies, or two input terminals and one output terminal for integrating signals of different frequencies.

However, conventional dual-band integrated circuits for wireless communication systems generally require two independent antennas to realize switching between dual bands, which result in high cost. Furthermore, signals from two frequency bands will interfere with each other through antenna radiation. In addition, conventional dual-band integrated circuits generally use active switches to control signals, which need additional power to operate and incur higher cost. In view of the aforementioned shortcomings, the present invention is provided to address these shortcomings.

SUMMARY OF THE INVENTION

A primary objective of the present invention is to provide a high-frequency switching extender, which is used in the environment of receiving signals from external routers and external devices and transmitting signals to external routers and external devices. The high-frequency switching extender, through the use of a high-frequency switching module comprising a plurality of single-pole double-throw (SPDT) switches, in combination with a control voltage provided by a high-frequency transceiver module, enables the high-frequency switching module to switch receiving and transmission signals to preset frequency bands based on the control voltage. Through the control signal provided by the high-frequency transceiver module, the high-frequency RF front-end module is controlled to match the preset frequency band. As such, the present invention can increase the network speed and bandwidth and can be directly connected to the existing router so as to exert the wide applicability and convenience of the high-frequency switching extender of the present invention.

Another objective of the present invention is to provide a quad-frequency switching extender, which simultaneously has the aforementioned high-frequency switching extender and an intermediate-to-low frequency switching extender, which switches the receiving and transmitting signals to a first or a second preset frequency band through the high-frequency switching extender, and switch the receiving and transmitting signals to a third, fourth, or fifth preset frequency band through the intermediate-to-low frequency switching extender. The above-preset frequency bands covers the 2.4 GHz-6 GHz frequency band, thereby realizing a quad-frequency switching extender capable of simultaneously providing users with different frequency bands. When using the 2.4 GHz frequency band, the present invention has the advantages of wide coverage and compatibility with more devices. When using the 6 GHz frequency band, the present invention has the advantages of less interference and increased transmission rate. In addition, the quad-frequency switching extender can use two different 5 GHz frequency bands at the same time and operate in different frequency ranges, avoiding mutual overlap and interference, and has wide applicability.

In order to achieve the aforementioned objectives and effects, the present invention provides a high-frequency switching extender, applicable to an environment for receiving a receiving signal of an external router and an external device and transmitting a transmission signal to an external router or at least one external device, the high-frequency switching extender includes: a high-frequency transceiver module, the high-frequency transceiver module providing a control voltage; a high-frequency switching module, coupled to the high-frequency transceiver module, the high-frequency switching module controls the transmission signal and the receiving signal based on the control voltage to switch to a preset frequency band; a high-frequency radio frequency (RF) front-end module, coupled to the high-frequency switching module; a high-frequency filter module, coupled to the high-frequency RF front-end module, and the high-frequency filter module being used to filter out signals other than the preset frequency band; a high-frequency antenna switching unit, coupled to the high-frequency filter module; and a high-frequency antenna, coupled to the high-frequency antenna switching unit; wherein, the high-frequency switching extender has a transmission mode and a reception mode; in the transmission mode, the high-frequency transceiver module transmits the transmission signal to the high-frequency switching module, the high-frequency switching module switches the transmission signal to the preset frequency band based on the control voltage, and the transmission signal switched to the preset frequency band is amplified through the high-frequency RF front-end module, and filtered by the high-frequency filter module to remove signals outside the preset frequency band, then transmitted to the high-frequency antenna for transmission via the high-frequency antenna switching unit; in the reception mode, the high-frequency antenna receives and transmits the receiving signal to the high-frequency antenna switching unit, and the high-frequency antenna switching unit switches the receiving signal to the preset frequency band based on the control voltage, and the receiving signal switched to the preset frequency band is filtered by the high-frequency filter modules to remove signals outside the preset frequency band and amplified by the high-frequency RF front-end module then transmitted to the high-frequency switching module and subsequently to the high-frequency transceiver module.

Preferably, according to the high-frequency switching extender of the present invention, the high-frequency RF front-end module comprises a power amplification unit, a low-noise amplification unit, and a switching unit.

Preferably, according to the high-frequency switching extender of the present invention, further comprising: a demultiplexing module, coupled to the high-frequency transceiver module and the high-frequency RF front-end module; wherein, the high-frequency transceiver module further provides a control signal, and the demultiplexing module controls the power amplification unit of the high-frequency RF front-end module to match the preset frequency band according to the control signal.

Preferably, according to the high-frequency switching extender of the present invention, the high-frequency switching module comprises a plurality of single-pole double-throw switches.

Preferably, according to the high-frequency switching extender of the present invention, the high-frequency filter module comprises a plurality of band-pass filters.

Preferably, the high-frequency switching extender of the present invention comprises: a first frequency band switching unit, for switching the transmission signal to the preset frequency band according to the control voltage, and the preset frequency band comprising a first preset frequency band and a second preset frequency band; a second frequency band switching unit, for switching the receiving signal to the preset frequency band according to the control voltage; a first RF front-end unit, coupled to the first frequency band switching unit and the second frequency band switching unit, the first RF front-end unit being used for amplifying the transmission signal and the receiving signal of the first preset frequency band; a second RF front-end unit, coupled to the first frequency band switching unit and the second frequency band switching unit, the second RF front-end unit being used for amplifying the transmission signal and the receiving signal of the second preset frequency band; a first filter unit, coupled to the first RF front-end unit and being used for filtering out signals outside the first preset frequency band; a second filter unit, coupled to the second RF front-end unit and being used for filtering out signals outside the second preset frequency band.

Preferably, according to the high-frequency switching extender of the present invention, the control voltage comprises a high potential level and a low potential level; when the control voltage is at a high potential level, the first frequency band switching unit switches the transmission signal to the first preset frequency band, and the second frequency band switching unit switches the receiving signal to the first preset frequency band; when the control voltage is at a low potential level, the first frequency band switching unit switches the transmission signal to the second preset frequency band, and the second frequency band switching unit switches the receiving signal to the second preset frequency band.

Preferably, according to the high-frequency switching extender of the present invention, the first preset frequency band is a 6 GHz frequency band, and the second preset frequency band is a 5 GHz frequency band.

Preferably, the quad-frequency switching extender of the present invention, based on the high-frequency switching extender of the present invention, further comprises: an intermediate-to-low frequency switching extender, and the intermediate-to-low frequency switching extender comprises: an intermediate-to-low frequency transceiver module; an intermediate-to-low frequency RF front-end module, coupled to the intermediate-to-low frequency transceiver module; an intermediate-frequency switching unit, which is coupled to the intermediate-to-low frequency RF front-end module, and the intermediate-frequency switching unit being used for switching the transmission signal and the receiving signal to a third preset frequency band or a fourth preset frequency band; an intermediate-frequency filter module, coupled to the intermediate-frequency switching unit, and the intermediate-frequency filter module being used for filtering out signals outside the third preset frequency band or the fourth preset frequency band; an intermediate-frequency antenna switching unit, coupled to the intermediate-frequency filter module; a dual signal unit, coupled to the intermediate-frequency antenna switching unit and a fifth filter unit; and an intermediate-to-low frequency antenna, coupled to the dual signal unit.

Preferably, according to the quad-frequency switching extender of the present invention, the intermediate-to-low frequency switching extender further comprises: a low-frequency transceiver unit, used for transmitting or receiving the transmission signal and the receiving signal of a fifth preset frequency band; an intermediate-frequency transceiver unit, coupled to the low-frequency transceiver unit through the dual signal unit, and the intermediate-frequency transceiver unit being used for transmitting or receiving the transmission signal and the receiving signal of the third or fourth preset frequency band; a third RF front-end unit, coupled to the low-frequency transceiver unit; a fourth RF front-end unit, coupled to the intermediate-frequency transceiver unit; a fifth filter unit, coupled to the third RF front-end unit, the fifth filter unit being used for filtering out signals outside the fifth preset frequency band; a third filter unit is, coupled to the intermediate-frequency switching unit and being used for filtering out signals outside of the third preset frequency band; a fourth filter unit coupled to the intermediate-frequency switching unit and used for filtering out signals outside the fourth preset frequency band.

Preferably, according to the quad-frequency switching extender of the present invention, in the intermediate-to-low frequency switching extender, the third preset frequency band is a lower frequency segment in the 5 GHz frequency band, and the fourth preset frequency band is the full 5 GHz frequency band, and the fifth preset frequency band is the 2.4 GHz frequency band.

Preferably, according to the quad-frequency switching extender of the present invention, the first, second, third, and fourth preset frequency bands can be used as back-end transmission frequency bands, when the first preset frequency band is used as back-end transmission frequency band, the fifth preset frequency band and one of the third and fourth preset frequency bands are used as the front-end transmission frequency band; when the second preset frequency band is used as the back-end transmission frequency band, the fifth preset frequency band and one of the third preset frequency bands are used as the front-end transmission frequency band; when the third preset frequency band is used as the back-end transmission frequency band, the fifth preset frequency band and one of the first and second preset frequency bands are used as a front-end transmission frequency band; when the fourth preset frequency band is used as a back-end transmission frequency band, the fifth preset frequency band and the first preset frequency band are used as a front-end transmission frequency band.

In summary, the high-frequency switching extender provided by the present invention can achieve the objectives of increasing network speed and bandwidth, can be directly connected to existing routers, and has the effects of wide applicability and convenience. In addition, the quad-frequency switching extender provided by the present invention has both the aforementioned high-frequency switching extender and intermediate-to-low frequency switching extender, and its application range covers the frequency band from 2.4 GHz to 6 GHz. The quad-frequency switching extender enables multiple devices to operate in different frequency ranges to avoid mutual overlap and interference and has wide applicability.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
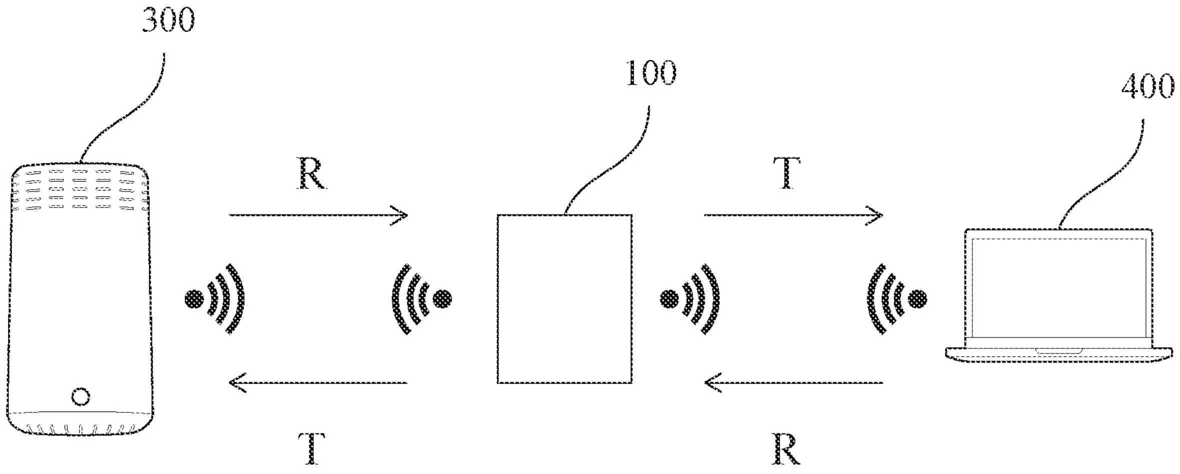
FIG. 1 is a schematic view illustrating an application of a high-frequency switching extender of the present invention.
Figure 2:
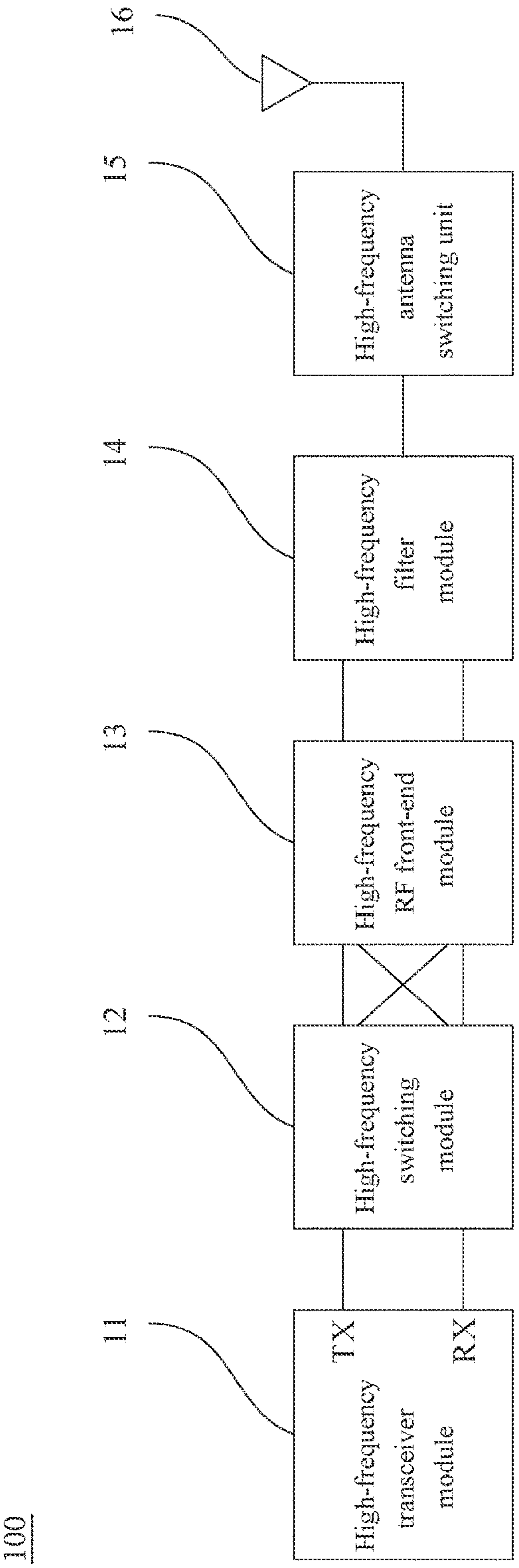
FIG. 2 is the schematic view of the high-frequency switching extender of the present invention.

Refer to FIG. 1 and FIG. 2, wherein FIG. 1 is a schematic view illustrating an application of a high-frequency switching extender of the present invention, and FIG. 2 is the schematic view of the high-frequency switching extender of the present invention. As shown in FIGS. 1 and 2, the high-frequency switching extender 100 of the present invention is applied to an environment to receive the receiving signal R from the external router 300 and the external device 400 and to transmit the transmission signal T to the external router 300 and the external device 400. Wherein, the high-frequency switching extender 100 includes: a high-frequency transceiver module 11, a high-frequency switching module 12, a high-frequency radio frequency (RF) front-end module 13, a high-frequency filter module 14, a high-frequency antenna switching unit 15, and a high-frequency antenna 16.

Specifically, the high-frequency transceiver module 11 of the present invention is used to control the high-frequency switching extender 100. The high-frequency transceiver module 11 has a transmission signal end TX and a receiving signal end RX, and the high-frequency transceiver module 11 provides a control voltage and a control signal. In some embodiments, the control voltage provided by the high-frequency transceiver module 11 can include a high potential level and a low potential level. For example, the high potential level can be 3V, and the low potential level can be 0V. When the control voltage is transmitted to the high-frequency switching module 12, the high-frequency switching module 12 can switch the transmission signal and the receiving signal to a corresponding preset frequency band according to whether the control voltage is at the high potential level or low potential level.

Figure 3:
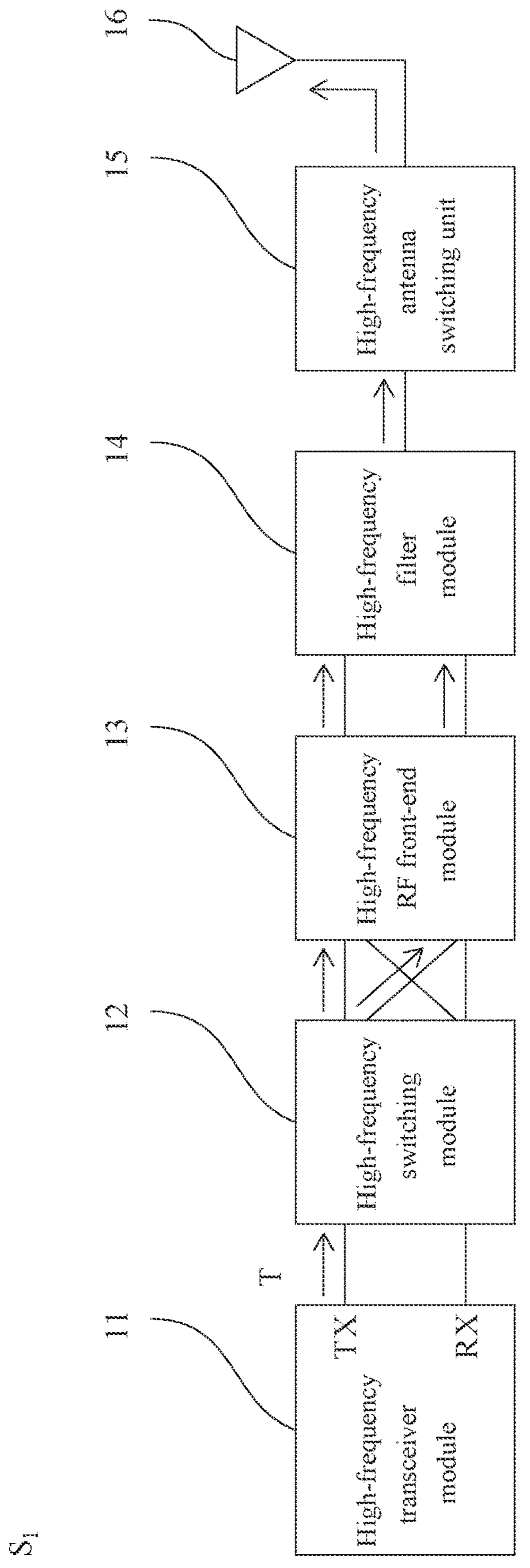
FIG. 3 is a schematic view illustrating the high-frequency switching extender of the present invention in a transmission mode.
Figure 4:
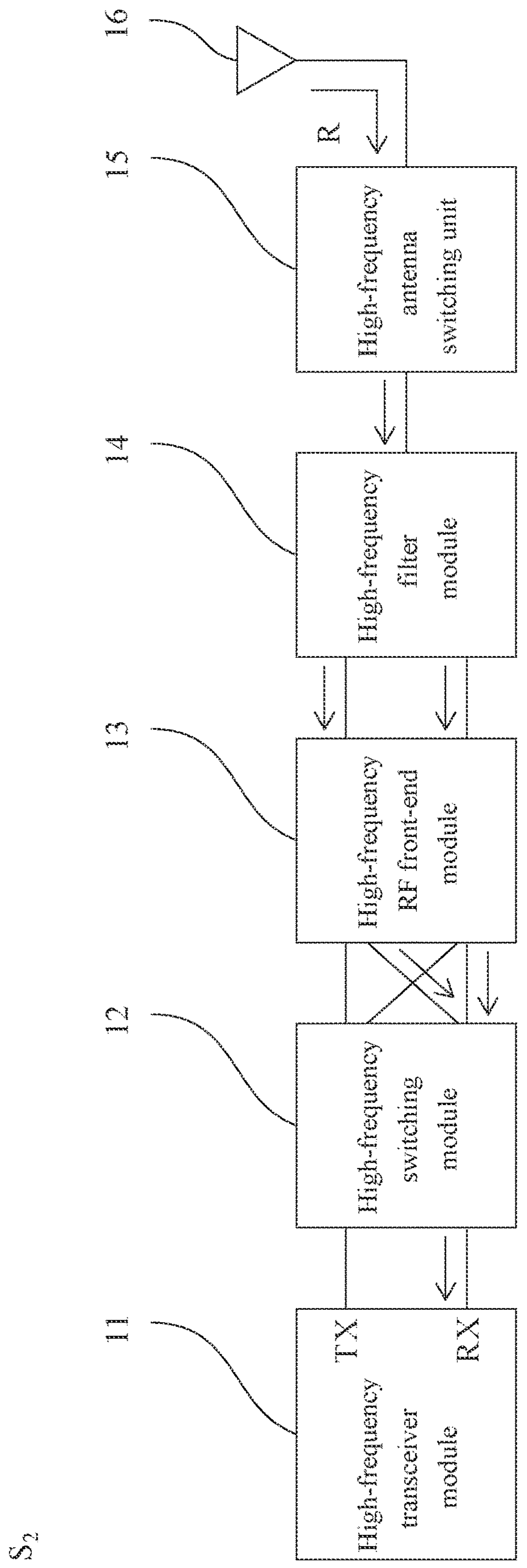
FIG. 4 is a schematic view illustrating the high-frequency switching extender of the present invention in a receiving mode.

Refer to FIGS. 3 and 4, as well as, FIGS. 1 and 2. FIG. 3 illustrates a schematic view of the high-frequency switching extender of the present invention in a transmission mode, and FIG. 4 is a schematic view illustrating the high-frequency switching extender of the present invention in a reception mode. The high-frequency switching module 12 of the present invention, which is coupled to the high-frequency transceiver module 11, switches the receiving signal R and the transmitting signal T to a preset frequency band according to the control voltage. Specifically, in some embodiments, the high-frequency switching module 12 comprises a plurality of single-pole double-throw (SPDT) switches, where one of the SPDT switches is used in the transmission mode S1, and the other is applied to the receiving mode S2. In combination with the control voltage provided by the high-frequency transceiver module 11, the high-frequency switching module 12 can switch the receiving signal R and the transmitting signal T to a preset frequency band based on the control voltage.

In some embodiments, the control signal provided by the high-frequency transceiver module 11 can be a general-purpose input/output (GPIO), and the GPIO is flexible and can be controlled by digital signal from software. The user can freely use the GPIO pins, and the pins can be used as general-purpose input, general-purpose output, or general-purpose input and output according to applications. More specifically, the GPIO can have three states, including High (voltage), Low (voltage) and High impedance (Hi-Z), wherein High represents that the state of the digital signal is 1, Low represents that the state of the digital signal is 0, and High impedance represents that the state of the digital signal may be 0 or may be 1, for example, when the potential level of the GPIO is 3.3V, it means High, and when the potential level of the GPIO is 0V, it means Low.

Refer to FIGS. 1-4. The high-frequency radio frequency front-end (RF front-end, RFFE) module 13 of the present invention is coupled to the high-frequency switching module 12, and the high-frequency RF front-end module 13 can have both a transmitting part and a receiving part. The high-frequency RFFE module 13 receives the receiving signal R and the transmission signal T, which are switched to the preset frequency bands. The high-frequency RFFE module 13 can match the received signal R and the transmitted signal T to the preset frequency band according to the control signal provided by the high-frequency transceiver module 11. The high-frequency switching extender 100 of the present invention can amplify the transmission power through the high-frequency RFFE module 13 to ensure the received signal strength and signal stability. In some embodiments, the high-frequency RFFE module 13 may include a power amplification unit, a low-noise amplification unit, and a switching unit. Wherein, the power amplification unit is mainly used to enhance the transmission signal T, the low-noise amplification unit is mainly used to enhance the receiving signal R, and the switching unit is mainly used to switch the high-frequency RFFE module 13 between the transmission and the receiving modes.

The high-frequency filter module 14 of the present invention is coupled to the high-frequency RFFE module 13, and the high-frequency filter module 14 comprises a high-frequency filter used to filter out signals outside the preset frequency band. In some embodiments, the high-frequency filter may include multiple band-pass filters. These band-pass filters for different frequency bands only allow analog signals within specific frequency ranges to pass through so as to filter out analog signals outside the specific frequency ranges and reduce noise interference.

The high-frequency antenna switching unit 15 of the present invention is coupled to the high-frequency filter module 14. The high-frequency antenna switching unit 15 is used to transmit the transmission signal T that has been switched to the preset frequency band to the high-frequency antenna 16 and, after receiving the receiving signal from the high-frequency antenna 16, to switch the receiving signal to the preset frequency band based on the control voltage. In some embodiments, the high-frequency antenna switching unit 15 can be selected from one of the Single Pole Single Throw, Single Pole Double Throw, Double Pole Single Throw, Double Pole Double Throw types, but the present invention is not limited thereto.

The high-frequency antenna 16 of the present invention is coupled to the high-frequency antenna switching unit 15. Thereby, the high-frequency switching extender 100 of the present invention can use only one high-frequency antenna 16, in combination with the high-frequency antenna switching unit 15 and the high-frequency switching module 12, to transmit the transmission signal T to be switched to different preset frequency bands and receive the receiving signal R to be switched to different preset frequency bands, while providing the advantages of low cost and wide applicability. In some embodiments, the high-frequency antenna 16 can be selected from one of dipole antennas, monopole antennas, loop antennas, inverted-F antennas, patch antennas, microstrip antennas, array antennas (serial, parallel) . . . etc.

Refer to FIGS. 1-4. The high-frequency switching extender 100 according to the present invention has a transmission mode S1 and a reception mode S2. The transmission mode S1 is for the high-frequency transceiver module 11 to transmit a transmission signal T to high-frequency switching module 12, the high-frequency switching module 12 switches the transmission signal T to the preset frequency band based on the control voltage of the high-frequency transceiver module 11, and the transmission signal T switched to the preset frequency band is amplified by the high-frequency RFFE module 13 and filtered out the signals outside the preset frequency band through the high-frequency filter module 14, and finally transmitted to the high-frequency antenna 16 by the high-frequency antenna switching unit 15 for transmitting externally. The reception mode S2 is for the high-frequency antenna 16 to receive a receiving signal R and transmitting to the high-frequency antenna switching unit 15, and the high-frequency antenna switching unit 15 switches the receiving signal R to a preset frequency band based on the control voltage. The receiving signal R of the preset frequency band is then filtered by the high-frequency filter module 14 to filter out the signals outside the preset frequency band, and after being amplified by the high-frequency RFFE module 13, the receiving signal R is transmitted to the high-frequency transceiver module 11 by the high-frequency switching module 12.

As can be seen from the above description, the high-frequency switching extender 100 of the present invention is applied to receive signals from the external router 300 and the external device 400 and transmit transmission signals to the external router 300 and the external device 400. By a plurality of SPDT switches in combination with the control voltage and control signal provided by the high-frequency transceiver module 11, the high-frequency switching module 12 can switch the receiving signal R and the transmitting signal T to the preset frequency band according to the control voltage, and make the high-frequency RFFE module 13 to match the received signal R and the transmitted signal T that is switched to the preset frequency band to the corresponding preset frequency band. As such, the network speed and bandwidth can be increased, and the present invention can be directly connected to the existing router, providing wide application and convenience.

Hereinafter, a first embodiment of the high-frequency switching extender 100 of the present invention will be described with reference to the drawings. Components, features and advantages that are substantially the same as the aforementioned component symbols will not be repeated.

Figure 5:
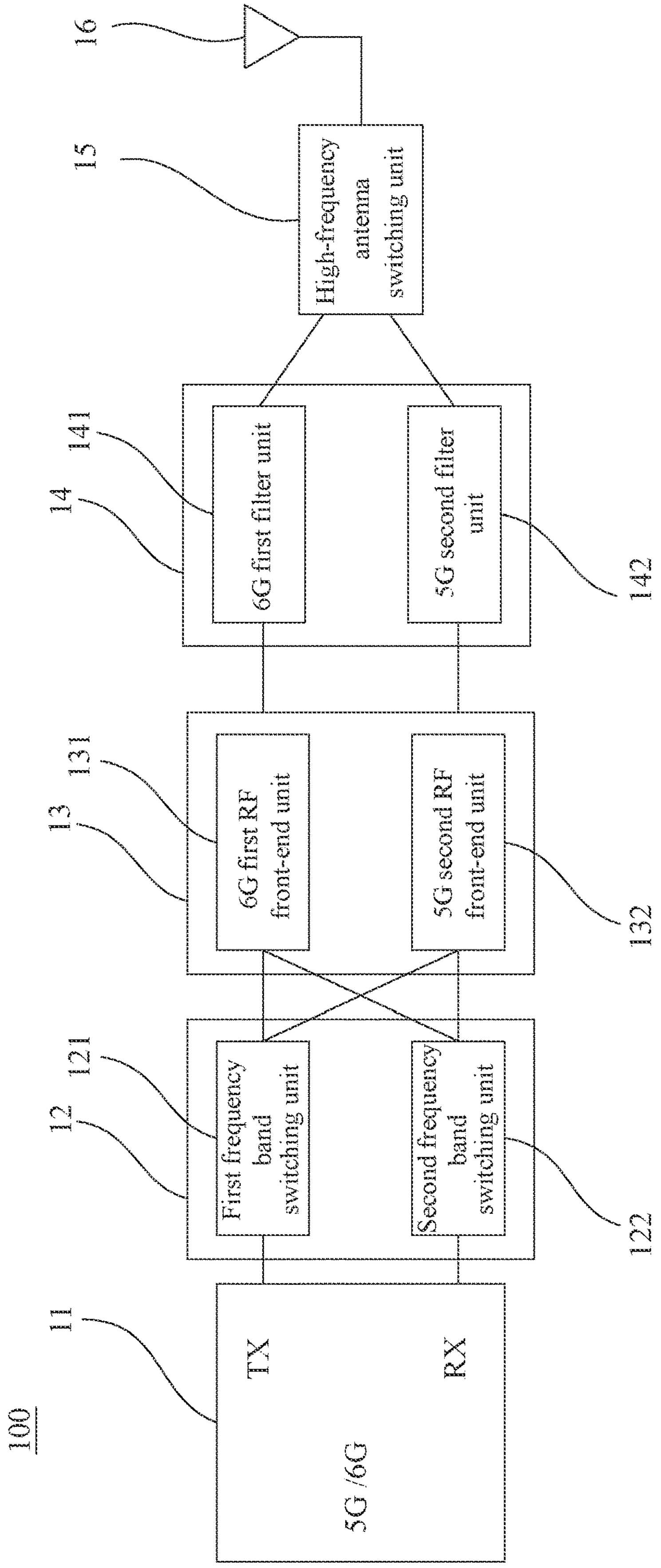
FIG. 5 is a schematic view of a high-frequency switching extender according to the first embodiment of the present invention.

Refer to FIG. 2 and FIG. 5. The high-frequency switching extender 100, according to the first embodiment of the present invention, includes: a high-frequency transceiver module 11, a high-frequency switching module 12, a high-frequency RFFE module 13, a high-frequency filter module 14, a high-frequency antenna switching unit 15, and a high-frequency antenna 16. As shown in FIG. 5, the high-frequency switching module 12, according to the first embodiment of the present invention, includes: a first frequency band switching unit 121 and a second frequency band switching unit 122. The first frequency band switching unit 121 comprises a first frequency band switch that switches the transmission signal T to a preset frequency band based on the control voltage, and the second frequency band switching unit 122 comprises a second frequency band switch that switches the receiving signal R to a preset frequency band based on the control voltage. In the present embodiment, the first frequency band switching unit 121 and the second frequency band switching unit 122 are SPDT switches for switching the transmission signal T and the receiving signal R to a preset frequency band. The preset frequency band includes the first preset frequency band and the second preset frequency band, wherein, the first preset frequency band is a 6 GHz frequency band between 5.925 GHz-7.125 GHZ, and the second preset frequency band is a 5 GHz frequency band between 5.180-5.850 GHz. Specifically, the second preset frequency band is in the 5 GHz frequency range with higher frequencies, such as, 5600, 5620, 5640, 5660, 5680, 5700, 5745, 5765, 5785, 5805, 5825 MHz, etc. However, the present invention is not limited thereto.

In addition, as shown in FIG. 5, in the present embodiment, the high-frequency RFFE module 13 includes a first RF front-end unit 131 and a second RF front-end unit 132, and the high-frequency filter module 14 may include a first filter unit 141 and a second filter unit 142. The first RF front-end unit 131 comprises a first RF front-end circuit for amplifying the transmission signal and the receiving signal of the first preset frequency band, and the second RF front-end unit 132 comprises a second RF front-end circuit for amplifying the transmission signal and the receiving signal of the second preset frequency band. The first filter unit 141 comprises a first filter is used to filter out signals outside the first preset frequency band, the second filter unit 142 comprises a second filter used to filter out signals outside the second preset frequency band, so that the signal received and transmitted by the high-frequency switching extender of the present invention has a better signal-to-noise ratio.

Figure 6:
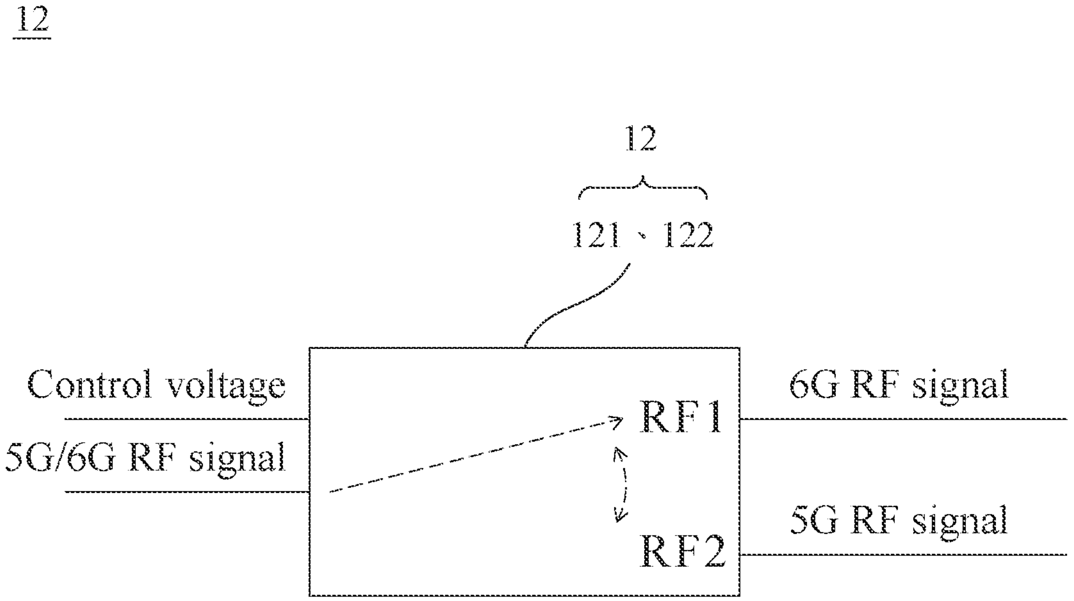
FIG. 6 is a schematic view illustrating a frequency band switching unit with a control voltage according to the first embodiment of the present invention.

Moreover, refer to FIG. 6, together with Table 1. FIG. 6 illustrates a schematic view of the frequency band switching units 121, 122 in combination with the control voltages according to the first embodiment of the present invention. Table 1 is a truth table for the first frequency band switching unit 121 and the second frequency band switching unit 122 with respect to control voltage. As shown in Table 1, in the first embodiment of the present invention, the frequency band switching unit switches the RF signal to the first preset frequency band (that is, the 6 GHz frequency band) when the control voltage is at a high potential level (H), and switches the RF signal to the second preset frequency band (that is, the 5 GHz frequency band) when the control voltage is low (L). As such, the high-frequency switching module 12 of the present embodiment can switch the transmission signal T and the receiving signal R to the preset frequency band only through the SPDT switches in conjunction with the control voltage provided by the high-frequency transceiver module 11.

TABLE 1

| Truth Table | | |
|---|---|---|
| Channel | Control Voltage | RF signal |
| RF1 | H | First preset frequency band (6G) |
| RF2 | L | Second preset frequency band (5G) |

Figure 7:
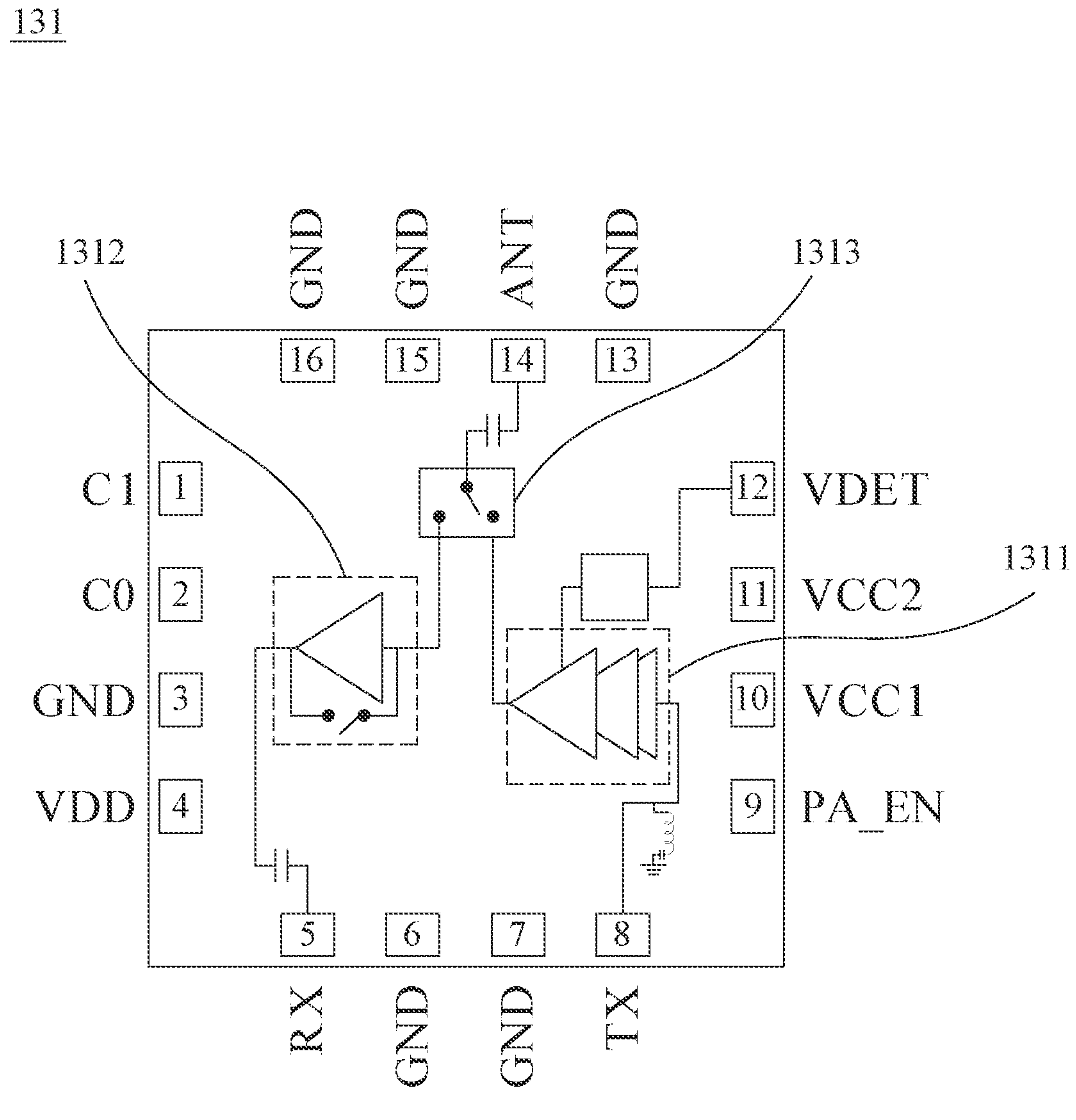
FIG. 7 is a schematic view of a high-frequency radio frequency front-end module according to the first embodiment of the present invention.
Figure 8:
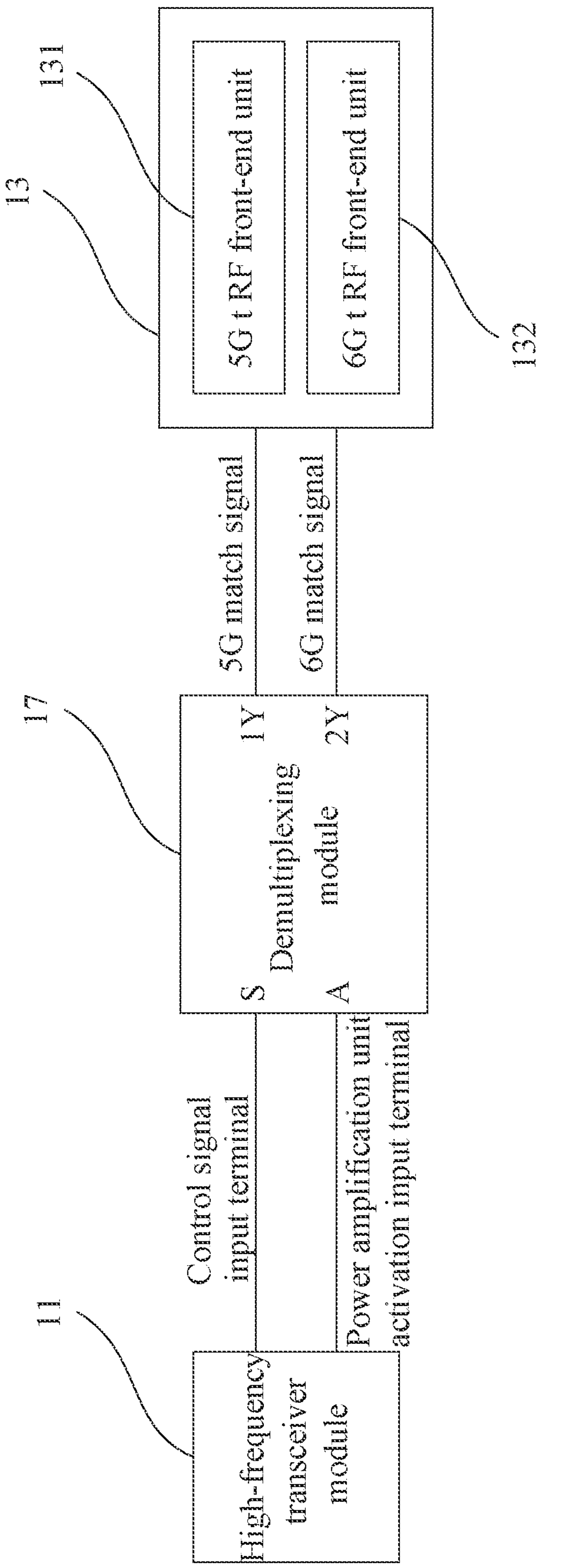
FIG. 8 is a schematic view of the demultiplexing module and related control signals according to the first embodiment of the present invention.

Refer to FIGS. 7-8, together with FIGS. 4-6. FIG. 7 is a schematic view of a high-frequency RFFE module according to the first embodiment of the present invention, and FIG. 8 is a schematic view of the demultiplexing module and related control signals according to the first embodiment of the present invention. As shown in FIG. 5, the high-frequency RFFE module 13 of the first embodiment of the present invention includes a first RFFE unit 131 and a second RFFE unit 132. The first RFFE unit 131 is coupled to the first frequency band switching unit 121 and the second frequency band switching unit 122, and the first RFFE unit 131 is used to amplify the transmission signal T and the receiving signal R of the first preset frequency band. The second RFFE unit 132 is coupled to the first frequency band switching unit 121 and the second frequency band switching unit 122, and the second RFFE unit 132 is used to amplify the transmission signal T and the receiving signal R of the second preset frequency band. Specifically, as shown in FIG. 7, the first RFFE unit 131 and the second RFFE unit 132 of the first embodiment of the present invention may include a power amplification unit 1311, a low-noise amplification unit 1312, and a switching unit 1313.

As shown in FIG. 8, in the present embodiment, the high-frequency switching extender 100 further includes a demultiplexing module 17, coupled to the high-frequency transceiver module 11 and the high-frequency RFFE module 13. The control signals provided by the frequency transceiver module 11 are GPIO. As such, the high-frequency switching extender 100 of the present invention can provide GPIO control signals to the demultiplexing module 17 through the high-frequency transceiver module 11 to control the units inside the high-frequency RFFE module 13.

Refer to FIG. 7 and FIG. 8. The high-frequency switching extender 100 of the first embodiment of the present invention further utilizes the demultiplexing module 17 with control signals to perform the preset frequency band matching of the first RFFE unit 131 and the second RFFE unit 132. As shown in FIG. 8, the demultiplexing module 17 has a control signal input terminal (S) and a power amplification unit activation input terminal (A), and is connected to the first RFFE unit 131 and the second RFFE unit 132. Table 2 is a function table for the multiplexing module 17 in combination with the control signal. As shown in Table 2, when the control signal (S) of the GPIO is low (L) and the activation potential (A) for the power amplification unit is high (H), the first RFFE unit 131 (1Y) will be activated, and the power amplification unit 1311 of the high-frequency RFFE module 13 can be switched and matched to the second preset frequency band (5G). When the control signal (S) of the GPIO is high (H) and the activation potential (A) for the power amplification unit is also high (H), the second RFFE unit 132 (2Y) will be activated, and the power amplification unit 1311 of the RFFE module 13 can be switched and matched to the first preset frequency band (6G). By controlling the first RFFE unit 131 and the second RFFE unit 132 through the demultiplexing module 17, the high-frequency RFFE module 13 of the present invention is matched to a preset frequency band, thereby achieving the purpose of increasing the bandwidth of the network.

| Function table | | | | |
|---|---|---|---|---|
| Input | | Output | | |
| S | A | 1Y | 2Y | Match signal |
| L | H | H | Z | Second preset frequency band (5G) |
| H | H | Z | H | First preset frequency band (6G) |

Those skilled in the art to which the present invention belongs can make various changes and adjustments based on the above embodiments, which will not be exhaustive here. The following will focus on explaining the application embodiment of the present invention in a quad-frequency switching extender.

Figure 9:
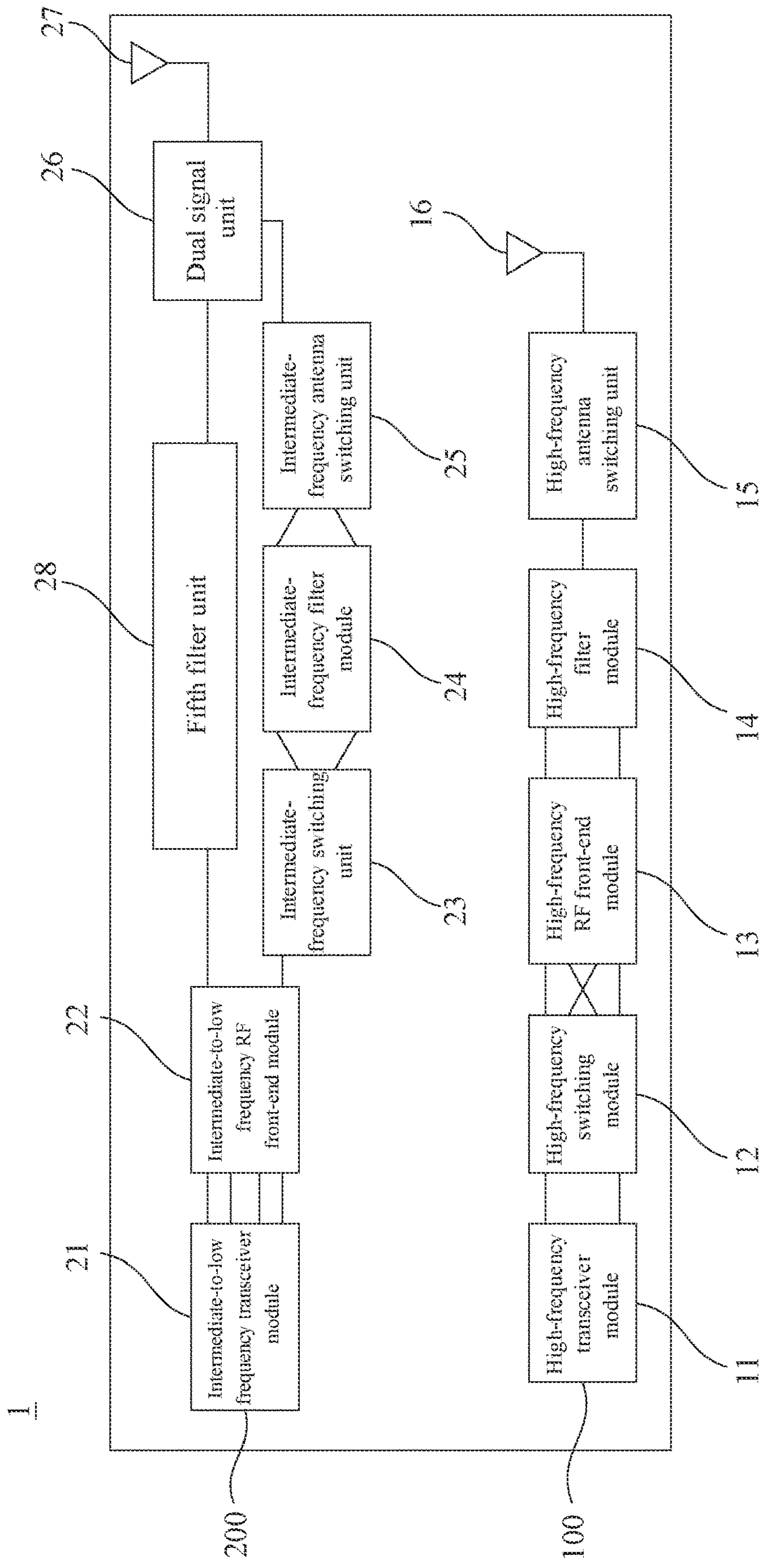
FIG. 9 is a schematic view of a quad-frequency switching extender of the present invention.
Figure 10:
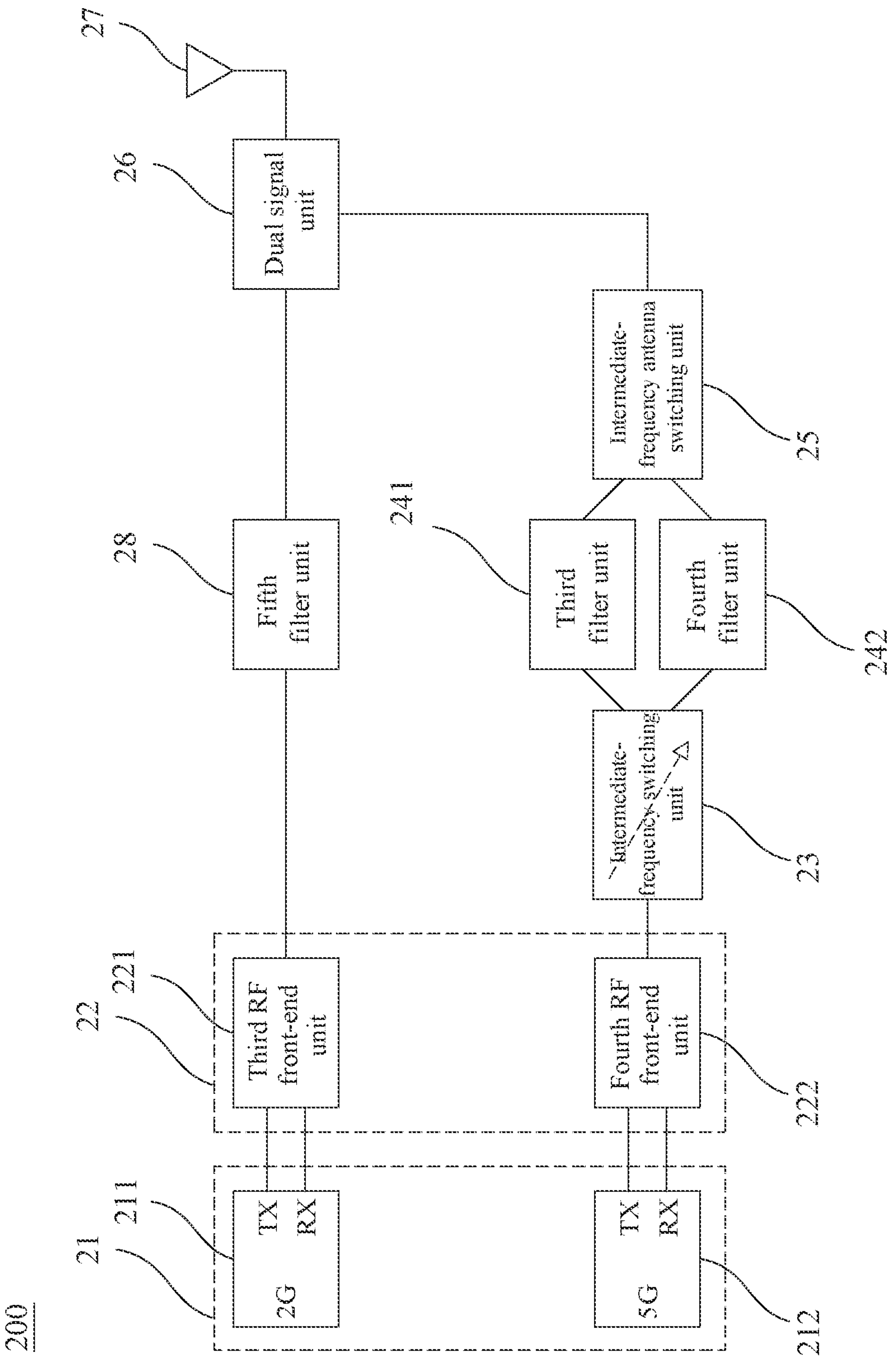
FIG. 10 is a schematic view of an intermediate-to-low frequency switching extender in the present invention.

Refer to FIGS. 9-10. FIG. 9 is a schematic view of a quad-frequency switching extender 1 of the present invention; FIG. 10 is a schematic view of a intermediate-to-low frequency switching extender of the present invention. As shown in FIG. 9, the quad-frequency switching extender 1 of the present invention includes a high-frequency switching extender 100 and an intermediate-to-low frequency switching extender 200, and the intermediate-to-low frequency switching extender 200 includes: an intermediate-to-low frequency transceiver module 21, an intermediate-to-low frequency RFFE module 22, a fifth filter unit 28, an intermediate-frequency switching unit 23, an intermediate-frequency filter module 24, an intermediate-frequency antenna switching unit 25, a dual signal unit 26, and an intermediate-to-low frequency antenna 27.

The intermediate-frequency switching unit 23 of the present invention is coupled to the intermediate-to-low frequency RFFE module 22 and used to switch the transmission signal T and the receiving signal R to the third or fourth preset frequency band. The third preset frequency band is a lower frequency segment in the 5 GHz frequency band, such as 5180, 5190, 5200, 5210, 5220, 5230, 5240, 5260, 5280, 5300 MHz, etc. Compared with the third preset frequency band, the second preset frequency band is a higher-frequency segment within the 5 GHz frequency band, such as 5600, 5620, 5640, 5660, 5680, 5700, 5745, 5765, 5785, 5805, 5825 MHz, etc., and the fourth preset frequency band can be a full frequency band of 5 GHz. The intermediate-to-low frequency switching extender 200 of the present invention controls switching of the preset frequency bands through the control voltage and control signal provided by the intermediate-to-low frequency transceiver module 21, in the same principle that of the high-frequency switching extender 100 and will not be repeated here. Thereby, the quad-frequency switching extender 1 of the present invention can use different 5 GHz frequency bands and operate in different frequency ranges, avoiding mutual overlap and interference to provide wide applicability, but the present invention is not limited thereto.

The dual signal unit 26 of the present invention is coupled between the intermediate-frequency antenna switching unit 25 and the intermediate-to-low frequency antenna 27. The dual signal unit 26 is mainly used to make the transmission path and the receiving path of the intermediate-to-low frequency switching extender 200 integrated into the same intermediate-to-low frequency antenna 27 to reduce the use of antennas and costs.

Refer to shown in FIG. 10, the intermediate-to-low frequency transceiver module 21 of the present invention comprises a low-frequency transceiver unit 211 and an intermediate-frequency transceiver unit 212, wherein the low-frequency transceiver unit 211 is used to transmit or receive the transmission signal T and the receiving signal R over the fifth preset frequency band. The intermediate-frequency transceiver unit 212 is coupled to the low-frequency transceiver unit 211 through the dual signal unit 26, and the intermediate-frequency transceiver unit is used to transmit or receive the transmission signal T and the receiving signal R over the third or fourth preset frequency band. The intermediate-to-low frequency RFFE module 22 of the present invention includes a third RFFE unit 221 and a fourth RFFE unit 222. The third RF front-end unit 221 is mainly used to amplify the transmission signal T and the receiving signal R of the fifth preset frequency band. The fourth RFFE unit 222 is mainly used to amplify the transmission signal T and the receiving signal R of the third or fourth preset frequency band. The fifth filter unit 28 of the present invention is coupled to the third RFFE unit 221, and the fifth filter unit 28 is used to filter out signals other than the fifth preset frequency band. In the present embodiment, the fifth preset frequency band is the 2.4 GHz frequency band, which is between 2.4-2.462 GHz. The intermediate-frequency filter module 24 of the present invention includes a third filter unit 241 and a fourth filter unit 242. The third filter unit 241 and the fourth filter unit 242 are coupled to the intermediate-frequency switching unit 23 and the intermediate-frequency antenna switching unit 25. The third filter unit 241 is used to filter out signals outside the third preset frequency band, and the fourth filter unit 242 is used to filter out signals outside the fourth preset frequency band.

Figure 11:
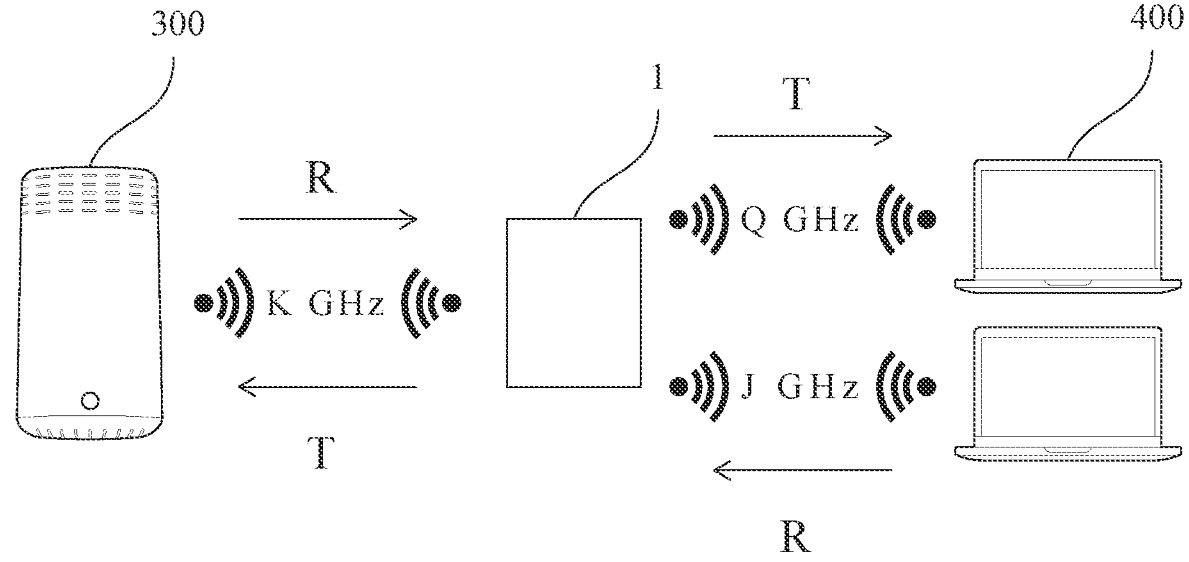
FIG. 11 is a schematic view of the use of the quad-frequency switching extender of the present invention.

Refer to FIG. 11. FIG. 11 is a schematic view of the use of the quad-frequency switching extender 1 of the present invention. According to the quad-frequency switching extender 1 of the present invention, the first, second, third, and fourth preset frequency bands can be used as the back-end transmission frequency band K GHz. When the first preset frequency band is used as the back-end transmission frequency band K GHz, the fifth preset frequency band and one of the third and fourth preset frequency bands can be used as the front-end transmission frequency bands Q GHz and J GHz. When the second preset frequency band is used as the back-end transmission frequency band K GHz, the fifth preset frequency band and one of the third preset frequency bands can be used as the front-end transmission frequency bands Q GHz and J GHz. When the third preset frequency band is used as the back-end transmission frequency band K GHz, the fifth preset frequency band and one of the first and second preset frequency bands can be used as the front-end transmission frequency bands Q Ghz and J GHz. When the fourth preset frequency band is used as the back-end transmission frequency band K GHz, the fifth and first preset frequency bands can be used as the front-end transmission frequency bands Q GHz and J GHz.

As such, the quad-frequency switching extender 1 of the present invention combines the characteristics of the aforementioned high-frequency switching extender 100 and the intermediate-to-low frequency switching extender 200 and controls the switching of the receiving signal R and the transmitting signal T to the first preset frequency band or the second preset frequency band through the high-frequency switching extender 100, and controls the switching of the receiving signal R and the transmission signal T to the third preset frequency band, the fourth preset frequency band, or the fifth preset frequency band through the intermediate-to-low frequency switching extender 200, covering the 2.4 GHz-6 GHz frequency band. Thereby realizing a quad-frequency switching extender that simultaneously provides different frequency bands for users. When using the 2.4 GHz frequency band, the present invention provides wider coverage and compatibility with more devices. When using the 6 GHz frequency band, the present invention provides the advantages of less interference and increased transmission rate. The quad-frequency switching extender 1 can simultaneously use two different 5 GHz frequency bands operating in different frequency ranges to avoid overlap and interference, making it highly versatile.

Although the present invention has been described with reference to the preferred embodiments thereof, it is apparent to those skilled in the art that a variety of modifications and changes may be made without departing from the scope of the present invention, which is intended to be defined by the appended claims.

What is claimed is:

1. A high-frequency switching extender, applicable to an environment for receiving a receiving signal from an external router and an external device and transmitting a transmission signal to an external router or at least one external device, the high-frequency switching extender comprising:

a high-frequency transceiver module, the high-frequency transceiver module providing a control voltage;

a high-frequency switching module, coupled to the high-frequency transceiver module, the high-frequency switching module controlling the transmission signal and the receiving signal based on the control voltage to switch to a preset frequency band;

a high-frequency radio frequency (RF) front-end module, coupled to the high-frequency switching module;

a high-frequency filter, coupled to the high-frequency RF front-end module, and the high-frequency filter filtering out signals other than the preset frequency band;

a high-frequency antenna switching unit, coupled to the high-frequency filter; and a high-frequency antenna, coupled to the high-frequency antenna switching unit;

wherein, the high-frequency switching extender has a transmission mode and a reception mode; in the transmission mode, the high-frequency transceiver module transmits the transmission signal to the high-frequency switching module, the high-frequency switching module switches the transmission signal to the preset frequency band based on the control voltage, and the transmission signal switched to the preset frequency band is amplified through the high-frequency RF front-end module and filtered by the high-frequency filter to remove signals outside the preset frequency band, then transmitted to the high-frequency antenna for transmission via the high-frequency antenna switching unit; in the reception mode, the high-frequency antenna receives and transmits the receiving signal to the high-frequency antenna switching unit, and the high-frequency antenna switching unit switches the receiving signal to the preset frequency band based on the control voltage, and the receiving signal switched to the preset frequency band is filtered by the high-frequency filter to remove signals outside the preset frequency band and amplified by the high-frequency RF front-end module, then transmitted to the high-frequency switching module and subsequently to the high-frequency transceiver module.

2. The high-frequency switching extender according to claim 1, wherein the high-frequency RF front-end module comprises a power amplification unit, a low-noise amplification unit, and a switching unit.

3. The high-frequency switching extender according to claim 2, further comprising:

a demultiplexing module, coupled to the high-frequency transceiver module and the high-frequency RF front-end module;

wherein the high-frequency transceiver module further provides a control signal, and the demultiplexing module controls the power amplification unit of the high-frequency RF front-end module to match the preset frequency band according to the control signal.

4. The high-frequency switching extender according to claim 1, wherein the high-frequency switching module comprises a plurality of single-pole double-throw switches.

5. The high-frequency switching extender according to claim 1, wherein the high-frequency filter comprises a plurality of band-pass filters.

6. The high-frequency switching extender according to claim 1, further comprising:

a first frequency band switch, for switching the transmission signal to the preset frequency band according to the control voltage, and the preset frequency band comprising a first preset frequency band and a second preset frequency band;

a second frequency band switch, for switching the receiving signal to the preset frequency band according to the control voltage;

a first radio frequency (RF) front-end circuit, coupled to the first frequency band switch and the second frequency band switch, the first RF front-end circuit amplifying the transmission signal and the receiving signal of the first preset frequency band;

a second radio frequency (RF) front-end circuit, coupled to the first frequency band switch and the second frequency band switch, the second RF front-end circuit amplifying the transmission signal and the receiving signal of the second preset frequency band;

a first filter, coupled to the first RF front-end circuit for filtering out signals outside the first preset frequency band; and a second filter, coupled to the second RF front-end circuit for filtering out signals outside the second preset frequency band.

7. The high-frequency switching extender according to claim 6, wherein the control voltage comprises a high potential level and a low potential level; when the control voltage is at a high potential level, the first frequency band switch switches the transmission signal to the first preset frequency band, and the second frequency band switch switches the receiving signal to the first preset frequency band; when the control voltage is at a low potential level, the first frequency band switch switches the transmission signal to the second preset frequency band, and the second frequency band switch switches the receiving signal to the second preset frequency band.

8. The high-frequency switching extender according to claim 7, wherein the first preset frequency band is a 6 GHz frequency band, and the second preset frequency band is a 5 GHz frequency band.

* * * * *